(12) United States Patent
Dollar

(10) Patent No.: US 7,631,371 B2
(45) Date of Patent: Dec. 15, 2009

(54) SURVIVAL KIT AND COMMODE

(76) Inventor: James R Dollar, 31 Stonehaven Dr., Bella Vista, AK (US) 72715

(*) Notice: Subject to any disclaimer, the term of this patent is extended or adjusted under 35 U.S.C. 154(b) by 925 days.

(21) Appl. No.: 11/293,688

(22) Filed: Dec. 5, 2005

(65) Prior Publication Data
US 2007/0128149 A1    Jun. 7, 2007

(51) Int. Cl.
*A47K 11/02* (2006.01)
(52) U.S. Cl. .......................................... 4/449
(58) Field of Classification Search ............... 4/449, 4/451, 453, 459, 460, 479
See application file for complete search history.

(56) References Cited

U.S. PATENT DOCUMENTS

| | | | | | |
|---|---|---|---|---|---|
| 4,536,902 | A | * | 8/1985 | McGill | 4/449 |
| 4,710,989 | A | * | 12/1987 | Grenthe | 4/449 |
| 5,682,623 | A | * | 11/1997 | Fenoglio | 4/449 |

* cited by examiner

*Primary Examiner*—Tuan N Nguyen
(74) *Attorney, Agent, or Firm*—Roger Aceto

(57) ABSTRACT

A survival kit for use in disaster areas where there is a loss of sanitation facilities. The kit is a watertight container that includes one or more survival kit items including food and water and in addition includes a packet containing a chemical toilet composition. After the survival kit items are removed, the container is used as a chemical toilet. For this purpose the top of the container has a commode opening and a cover the releaseably seals the opening.

20 Claims, 2 Drawing Sheets

SURVIVAL KIT AND COMMODE

CROSS-REFERENCE TO RELATED APPLICATIONS

None

STATEMENT REGARDING FEDERALLY SPONSORED RESEARCH OR DEVELOPMENT

None

REFERENCE TO A "SEQUENCE LISTING"

Not applicable.

BACKGROUND OF THE INVENTION

1. Field of the Invention

The present invention relates generally to a survival kit as may be useful in the event of a disaster. More particularly, the invention relates to a survival kit as may be particularly useful in the event of a natural disaster such as a flood, earthquake, hurricane and the like that may affect a large urban population.

2. Description of Related Art

Wilderness survival kits take many forms and generally are small enough to be easily carried on one's person such as in a backpack. People taking cross-country auto trips often carry flares and first aid items in the trunk of their autos. In times of inclement weather, such as snowstorms, local governments urge residents to prepare for possible power outages by stocking water, batteries, food and warm clothing.

The devastations of urban areas, particularly those in costal areas wrought by natural disasters can be monumental as evidenced by the recent inundation and devastation of New Orleans and the Gulf Coast of the United States by back-to-back hurricanes. Such disasters befalling large urban populations are particularly devastating and onerous. This is so because they deprive populations stranded by flooding and impassable roadways with the accustomed conveniences associated with urban living. These include ready access to food and the conveniences afforded by public utilities such as electricity, running water and sanitary facilities.

In preparing for such a natural disaster, the usual course, other than evacuation or when evacuation is not a viable solution, is to stock the necessities of food and water. Other recommended items to have on hand in the case of a disaster include among others, health and safety items such as batteries, a flash light, first aid kit, medications, liquid soap and other necessities such as toilet paper, plastic cups and tableware and trash bags. However, little if anything usually ever is done to prepare for the loss of sanitation facilities and in particular the accommodation of liquid and solid bathroom wastes.

The loss of sanitation facilities generally is not anticipated and becomes a considerable problem if the sanitary system of a densely populated area is lost to the populace for an extended period. A prime example of such a situation occurred during the housing of scores of people in supposedly safe evacuation shelters after the flooding of New Orleans. A similar fate can occur in high-rise living facilities when there is a loss of electric power. In such cases body wastes often must be collected in garbage cans, buckets or plastic bags. In extreme cases the corner of a room or closet serves as a latrine leading to unhealthy, unsanitary and extremely undesirable living conditions.

Accordingly, it is an object of the present invention to provide a survival kit that includes provision for sanitation and the collection of body wastes.

Another object of the present invention is to provide a survival kit wherein the container for the survival goods also functions as a commode.

A further object of the present invention is a survival kit including items for consumption and use to sustain life during a period of time following a natural disaster and which also provides for the collection and treatment of body wastes.

BRIEF SUMMARY OF THE INVENTION

A survival kit of the present invention comprises a sturdy, waterproof container into which is placed any number of items conventionally associated with survival kits. The items included in a survival kit may vary depending upon location and climate. For example a survival kit in a colder climate may include blankets whereas these might be omitted in a warmer climate.

In any event the kit should at least include items needed to support life such as food and water. In addition the kit preferably should include items for health and safety such as battery operated lighting, first-aid items, medications, sunscreens, extra clothing and insect repellants. In the event of an evacuation situation, the kit also should include comfort items such as an air mattress, and personal hygiene items such as toilet paper among others.

While items intended to support life and comfort items generally are included in a survival kit, little thought is given as to how to deal with body wastes. In this respect, while toilet paper is often recommended as an item for inclusion into a survival kit, nothing other than perhaps plastic bags is ever included for the handling and storage of such wastes.

Accordingly, in accordance with the present invention, the survival gear is packaged in a special container that functions as a commode when the survival items are removed. In this respect the container is watertight and has a top portion that has a commode opening and a removable cover sealing the opening. Included with the survival gear in the container is a packet containing a composition conventionally used to disinfect body wastes, as for example by changing fecal matter to a sludge.

If the packet is water soluble, it may be left in the container after the other survival items are removed. If the packet is not water-soluble, it is opened and the contents emptied into the container after the other survival items are removed.

Accordingly, the present invention may be characterized in one aspect thereof by a combination survival kit and commode comprising:

a) a water tight container having abase, upstanding side walls and a top;

b) survival items in the container including one or more packages of food and water and a packet containing a chemical toilet composition;

c) the container top having a commode opening extending through the top; and d) a removable cover sealing the opening.

BRIEF DESCRIPTION OF THE SEVERAL VIEWS OF THE DRAWING(S)

DETAILED DESCRIPTION OF THE INVENTION

Figure 1:
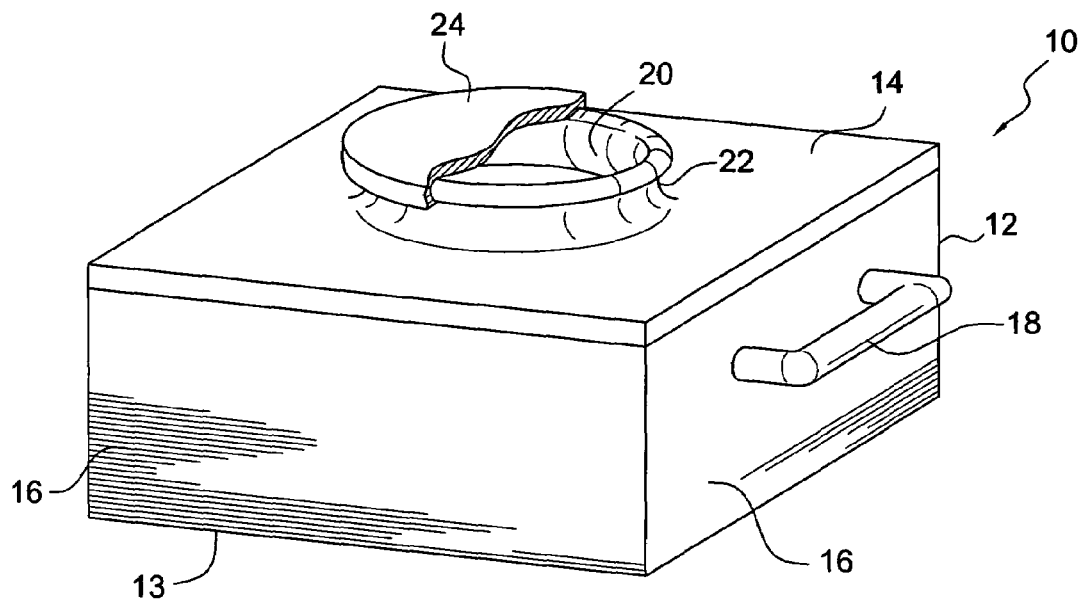
FIG. 1 is a perspective view of the combination survival kit and commode of the present invention with a cover removed.

Referring to the drawings, FIG. 1 shows the combination survival kit and commode of the present invention generally indicated at 10. The kit comprises a watertight container 12 having a base 13, upright sidewalls 16 and a top 14. In the embodiment of FIGS. 1-5 the top 14 is removable. The container preferably is formed of a sturdy plastic such that the wall strength of the upright walls 16 and container top will support the weight of an adult seated on the upper surface of the top 14. If desired, one of the upright walls 16 may be provided with a carrying handle 18. As the container is water tight, it may function as a floatation device. In this case the handle 18 becomes a handhold for a person in the water.

The top 14 of the container is formed with a commode opening 20. The opening may be merely cut through the material of the top so that the opening lies in the plane of the top. However, in a preferred embodiment as shown in the Figures, the material of the top indicated at 22 that defines the commode opening is raised slightly from the plane of the top and rounded so a sharp edged opening is avoided. Sealing the commode opening is a removable cover 24, a portion of which is seen in FIG. 1.

The connection of the top 14 to the upright walls should be watertight. In the embodiment shown in FIG. 2, the top is attached to the walls by a snap fit connection comprising male/female portions 26, 28 respectively that extend about the entire periphery of the container. If need be a gasket (not shown) can be interposed between the abutting surfaces of the top and walls to insure a watertight connection.

Figure 3:
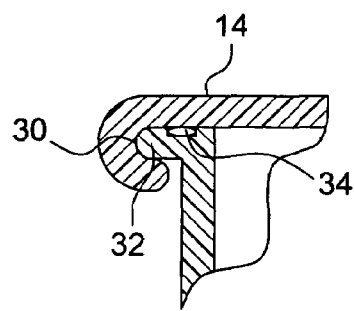
FIGS. 3 and 4 are views of a portion of the kit showing another embodiments.
Figure 4:
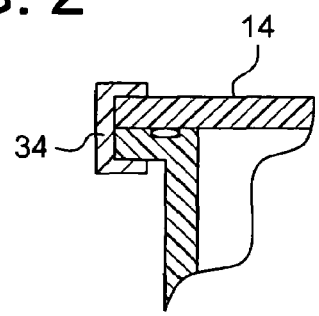

FIGS. 3 and 4 show possible alternate connection schemes. For example, in FIG. 3 the top 14 has a peripheral channel 30 that snap engages a peripheral lip 32 on the container. A gasket 34 is shown between the abutting surfaces of the top and the container. In FIG. 4 a clamp, over center lock or the like 34 is employed to hold the top tightly to the container.

Figure 2:
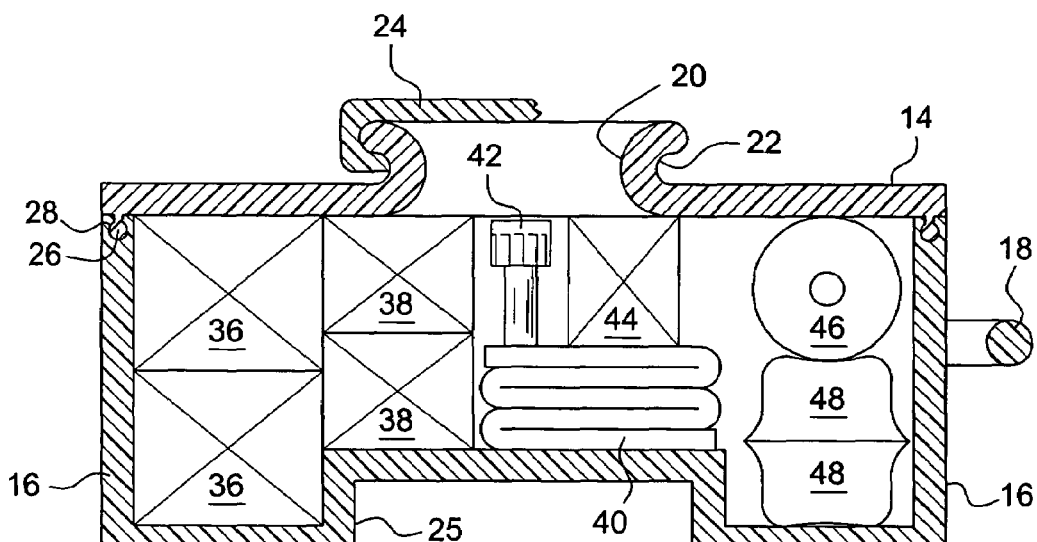
FIG. 2 is a front elevation view, on a larger scale, of the kit partly broken away and in section to show its packed contents.

Referring again to FIG. 2, the portion 22 of the top that defines the commode opening 20 is shown as being raised from the plane of the top. This allows the curving of the top portion 22 as shown to provide for a more comfortable seat when the cover 24 is removed. In this respect FIG. 2 shows the cover as being snapped connected to the top to render the container 16 watertight when both the top 14 and the cover 24 are in place. To permit the containers 12 to stack one upon the other, the base 13 of the container is provided with a recess 25 to accommodate the raised portion 22 and cover 24 of a second container.

Disposed within the watertight container are one or more packaged survival items. These include life sustaining essentials comprising a food package 36 and cartons or bottles of water or other potables 38. Other items that may be included are, among others, blankets, items of clothing or other fabric articles 40, a flashlight or other battery-operated light 42, a first aid kit 44 and paper towels and/or toilet paper 46.

In the present invention another essential included in the survival kit is one or more packets 48 of a composition commonly used in a chemical toilet to turn solid wastes to sludge and to disinfect and deodorize body wastes. For example, compositions often used in chemical toilets include, among others, formaldehyde, sodium hydroxide, calcium nitrate, azoniaadamantane chloride, enzymes or other bacterial agents and deodorants. The packet containing the chemical toilet composition itself may be watertight or contained in a watertight wrapping. Preferably however the packet is itself water soluble to facilitate use as set out hereinbelow.

Accordingly, while a representative sampling of suitable survival kit items are shown, it should be appreciated that except for the essentials of one or more packages of food and water or other potable and the chemical toilet composition, the items that may be included can be left to the discretion of the user.

To ready the container 12, it first is packed with the packet 48 of chemical toilet composition, packages (preferably themselves water tight) of food and water and what other items the user considers essential or necessary. The top 14 with the attached cover 24 then is fixed to the container to render the container watertight. The survival kit constituted in this manner can be stored until needed as, for example, in the evacuation of a disaster area or where some force of nature isolates or cuts off a populace from utility supplies and sanitation facilities. When such an event occurs, the user can carry the kit to an evacuation area. The stocked survival kits 10 also can be delivered or air dropped by a governmental or disaster response agency to those in need of the survival items. Moreover, as the container preferably is water tight, the survival kit can be dropped into water to act as a floatation aid for persons in the water.

As a first step in its use, the top 14 is removed to open the container so the survival items can be removed and then the top is replaced. The cover 24 is removed from the top to expose the commode opening 20 and the packet 48 of chemical toilet composition is opened and its contents placed into the empty container. If the packet is water-soluble, the entire packet can be left or placed into the empty container. Subsequently, non-potable water or even liquid body wastes introduced into the container will act to dissolve the packet to free the chemical toilet chemicals. The container now is ready to function as a chemical toilet.

After the container reaches its capacity in its use as a toilet, the commode opening is closed and sealed by replacing the cover 24. The container then can be stored in this condition until disaster situation is over and the body wastes contents of the container properly disposed of.

Figure 5:
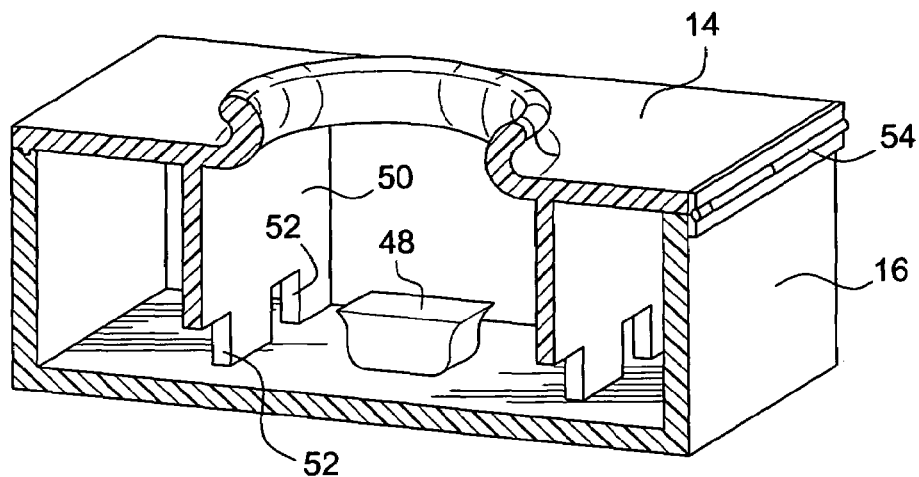
FIG. 5 is a perspective view, in section of another embodiment of the invention.

As noted above, the container is constructed so as to support the weight of an adult seated on the raised portion 22. If additional support is need to prevent collapse of the container under the weight of a seated adult, one or more internal supports 50 may be provided as shown in FIG. 5. These supports include openings 52 to allow fluids to flow evenly over the base of the container. FIG. 5 further shows that a hinge 54 can be used to connect the top to the container along one of the sidewalls 16. Such a hinge can facilitate the opening of the top to load and unload the container.

Figure 6:
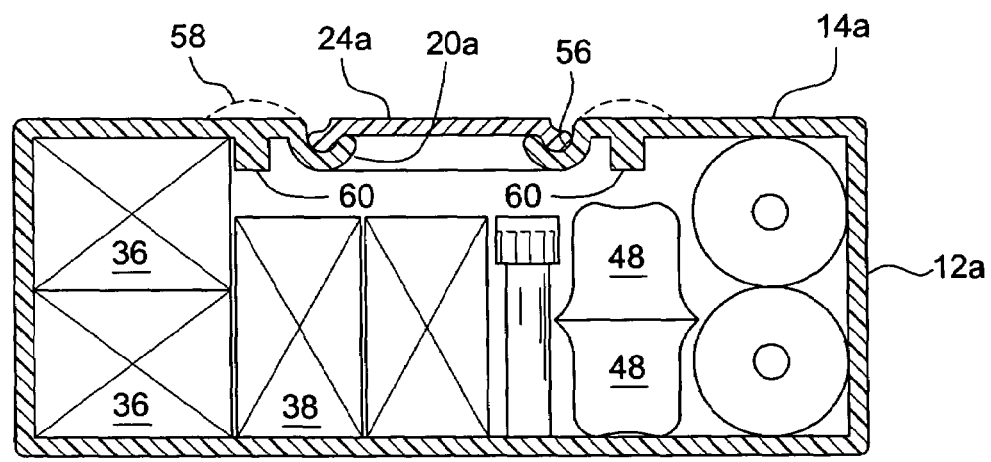
FIG. 6 is a view similar to FIG. 2 showing yet another embodiment of the invention.

Yet another embodiment of the invention is shown in FIG. 6. Here the container 12*a* is made in one piece such as by rotomolding a thermoplastic material so that the top portion 14*a* is an integral portion of the container 12. In this embodiment the top portion 14*a* has a commode opening 20*a* that lies generally within the plane of the top portion. Extending about the commode opening 20*a* is a channel 56. This channel receives the cover 24*a* in a snap-fit connection to seal the commode opening. As the commode opening in this embodiment is generally flush with the plane of the top, a plurality of the containers 12*a* are readily stackable with out the need to form a recess in the base of the container as shown in FIG. 2.

FIG. 6 further shows that brace members 60 may be formed integral the top adjacent the commode opening 20a. These braces extend front to back (or side-to-side) of the container to provide additional support so as to allow the container to support an adult seated on the top 14a of the container.

It should be appreciated that having a commode opening flush with the plane of the top forms a sharp edge so a sitting position may be less comfortable than the rounded configuration of the FIG. 2 embodiment. Accordingly, the mold used in the rotomolding operation may be configured to add an extra amount of material to the top as shown in dotted line at 58 to form a more rounded configuration adjacent the commode opening.

Figure 7:
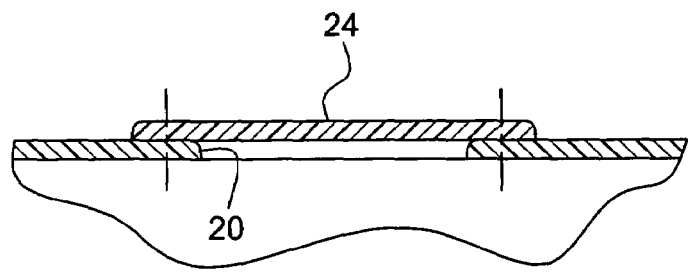
FIG. 7 is a view of a portion of the kit showing a still further embodiment.

While the covers 24, 24a are shown as being attached by a snap fit, other attachment methods are within the skill of the art. For example FIG. 7 shows a cover 24 attached by screws or other fasteners to the container top.

Accordingly, it should be appreciated that the present invention provides a survival kit wherein the container for the survival items functions as a chemical toilet after the survival items have been removed. The container is watertight and includes among its contents and in addition to food and water packages, a packet of a chemical toilet composition for the breaking down of human wastes into sludge and deodorizing. To facilitate its use as a chemical toilet the upper surface of the container has a commode opening and the structure of the container is such that it can support the weight of an adult seated on the container.

The combination survival kit and commode of the present invention is easily stored or transported and if necessary can be water dropped to serve as a flotation aid for persons in water. The kit provides both survival items and sanitary facilities. In this respect the container, when empty of the survival items, together with the chemical toilet compositions packed with the kit provides a place for the collection, treatment and storage of human body wastes in conditions where normal sanitary facilities are incapacitated due to a disaster event.

Having described the invention in detail, what is claimed as new is:

1. A combination survival kit and commode comprising:
   a) a water tight container having a base, upstanding walls and a top;
   b) survival items in the container including one or more packages of food and water and a packet containing a chemical toilet composition;
   c) the container top having a commode opening extending through the top; and
   d) a removable cover sealing the commode opening.

2. A combination survival kit and commode as is claim 1 wherein the top has a portion extending about the commode opening that is raised above the plane of the opening.

3. A combination survival kit and commode as in claim 2 wherein a plurality of the containers are stackable one upon the other wherein the base of each container has a recess such that the raised top portion of a lower container is received into the recess of the next higher container.

4. A combination survival kit and commode as in claim 1 wherein the packet containing the chemical toilet composition is water-soluble.

5. A combination survival kit and commode as in claim 1 wherein the chemical toilet composition is one or more of formaldehyde, sodium hydroxide, an enzyme and a deodorant.

6. A combination survival kit and commode as in claim 1 wherein the packages of food and water are water tight packages.

7. A combination survival kit and commode as in claim 1 wherein the container top is releaseably connected to the upstanding walls.

8. A combination survival kit and commode as in claim 7 wherein the container top is hinged along a side thereof to one of the upstanding walls.

9. A combination survival kit and commode as in claim 7 wherein the top is fixed to the upstanding walls by one of a snap fit, clamp and over center lock.

10. A combination survival kit and commode as in claim 1 wherein the container is able to support the weight of an adult seated on the top.

11. A combination survival kit and commode as in claim 1 wherein the container includes at least one internal reinforcing support extending between the base and the top.

12. A combination survival kit and commode as in claim 1 wherein the top includes brace members adjacent the commode opening.

13. A combination survival kit and commode as in claim 1 wherein the cover is snap fit over the commode opening.

14. A combination survival kit and commode as in claim 1 wherein the commode opening is in the plane of the top.

15. A combination survival kit and commode as in claim 1 wherein the survival kit items includes at least one of a battery operated light, a fabric article and toilet paper.

16. A combination survival kit and commode as in claim 1 wherein the container is a rotomolded article wherein the base, sidewalls and top define an integral one-piece article.

17. A combination survival kit and commode as in claim 1 wherein the container includes a carrying handle.

18. A method of providing a combination survival kit and commode comprising:
   a) forming a water tight container including a base, upstanding walls and a top, the top having a commode opening and a cover releaseably sealing the commode opening; and
   b) stocking the water tight container with a plurality of survival kit items including food and water and a packet containing a chemical toilet composition.

19. A method as in claim 18 further comprising:
   a) disposing the stocked container at a disaster area;
   b) removing the cover and removing from the container all of the survival kit items except for the packet;
   c) using the container as a chemical toilet to connect and store human wastes; and
   d) replacing the cover to seal the container.

20. A method as in claim 18 comprising forming the container with sufficient wall strength to allow the container to support the weight of an adult seated on the top.

* * * * *